United States Patent [19]

Chesser

[11] Patent Number: 5,305,959
[45] Date of Patent: Apr. 26, 1994

[54] INLET CHUTE FOR CHIPPER/SHREDDER

[75] Inventor: Thomas O. Chesser, Rensselaer, N.Y.

[73] Assignee: Garden Way Incorporated, Troy, N.Y.

[21] Appl. No.: 822,636

[22] Filed: Jan. 17, 1992

[51] Int. Cl.[5] ............................................ B02C 23/02
[52] U.S. Cl. ................................. 241/100; 241/101.7
[58] Field of Search ............. 241/100, 92, 301, 101.7; 193/3, 6, 15, 25 A, 25 E, 33, 2 C

[56] References Cited

U.S. PATENT DOCUMENTS

| | | | |
|---|---|---|---|
| 1,506,774 | 9/1924 | Redrup | 193/33 |
| 2,130,457 | 9/1938 | Fickett et al. | 241/92 |
| 3,069,101 | 12/1962 | Wexell | 241/92 |
| 3,095,073 | 6/1963 | Larson et al. | 193/33 |
| 3,270,968 | 9/1966 | Hess et al. | 241/295 |

FOREIGN PATENT DOCUMENTS 2138700 10/1984 United Kingdom ................ 241/100

*Primary Examiner*—Timothy V. Eley
*Assistant Examiner*—John M. Husar
*Attorney, Agent, or Firm*—Hayes & Reinsmith

[57] ABSTRACT

In chipper/shredder apparatus, an inlet extension secured to the inlet of the chipper/shredder, the extension being selectively movable toward and away from the chipper/shredder to effect a lowered position and a substantially upright position extending from the chipper/shredder inlet.

9 Claims, 3 Drawing Sheets

INLET CHUTE FOR CHIPPER/SHREDDER

FIELD OF THE INVENTION

This invention relates to apparatus which has become generally known as a chipper/shredder and is more specifically directed to improved feeding apparatus for such a chipper/shredder

BACKGROUND OF THE INVENTION

Chipper/shredders and similar apparatus have taken on a variety of forms and one such form is shown in co-pending application Ser. No. 07/789,053, filed Nov. 7, 1991 now U.S. Pat. No. 5,199,653 entitled DISCHARGE ASSEMBLY FOR CHIPPER/SHREDDER which shows an upright chipper/shredder but is provided with wheels to facilitate its movement from one operating location to another. Co-pending application Ser. No. 07/757,662 having a filing date of Sep. 10, 1991 now abandoned and entitled CHIPPER/SHREDDER VACUUM CLEANER shows a modification on the chipper/shredder apparatus wherein it is fully portable in a walk-behind manner, and is capable of providing a variety of functions ranging from the vacuuming of debris through the shredding of debris and the chipping of limbs, etc. Finally, there is yet another variation shown in co-pending application Ser. No. 07/795,516, filed Nov. 21, 1991 now U.S. Pat. No. 5,231,827 and entitled LAWN AND GARDEN CHIPPER/SHREDDER VACUUM APPARATUS, which apparatus also performs a variety of functions including vacuuming, chipping and shredding. All three applications are assigned to the assignee of the present invention and all three applications have, in common, the provision of an inlet chute to permit the selective insertion of limbs, twigs, etc. so that they may be reduced to chips of wood in accordance of the functioning of the apparatus. As is well known, the purpose behind such chipping and shredding apparatus is to reduce debris to small pieces to facilitate handling and disposal.

The length of the limb or branch which can be handled by a inlet chute on a particular chipper/shredder may present a problem requiring that the limb or branch be broken into shorter lengths before insertion into the chute so as to facilitate its handling by the operator, minimize unwanted "tipping" and improve its chipping by the apparatus. Moreover, inlet chutes can interfere with movement storage and use of the apparatus if, for example, combination chipping, shredding and vacuuming apparatus is to be used next to high vertical walls, pass through narrow gates, etc. where inlet chute length presents a problem.

SUMMARY OF THE INVENTION

It is a primary object of this invention to provide an improved feeding device for chipper/shredder apparatus which is light in weight, durable in use, easily moved and operated and, of course, easily manufactured and effective in handling extended length debris of all types;

It is a further principal object of this invention to provide an extension for the inlet chute on chipper/shredder apparatus, which extension can be folded downwardly to reduce the obscuring of the visibility of an operator when the operator is both moving the chipper/shredder from place to place and, on some occasions, using the apparatus for one of its combination functions;

It is a further object of this invention to provide a extension for the inlet chute on chipper/shredder apparatus, which extension is formed of spaced wire elements to provide minimum interruption of the visibility of an operator when moving the chipper/shredder and at the same time, providing a lightweight extension member that can be easily fabricated to become a useful integral part of the standard inlet chute; and It is a still further object of this invention to provide an improved chipper/shredder having enhanced material handling abilities.

Other objects will be in part obvious and in part pointed out in more detail hereinafter.

These and related objects are accomplished in accordance with the present invention by providing an inlet chute extension which, in its preferred embodiment, is foldable about one edge of the fixed inlet chute on the standard chipper/shredder so as to permit ease of movement without inadvertently engaging low hanging tree limbs, etc., and which, in its raised position, is rigidly affixed to the chipper inlet chute and is formed of a lattice work, typically formed wire, and which provides minimum interference with visibility or use when the chipper chute extension of the apparatus is in the raised position. The chute is hinged along one edge to an edge of the standard inlet chute of the chipper/shredder and is provided with a foldable support opposite the hinged edge, the inlet chute extension being generally U-shaped to permit it to be folded down about the top of the inlet to the chipper/shredder.

A better understanding will be obtained from the following description and the accompanying drawings of an illustrative embodiment of the invention.

DESCRIPTION OF A PREFERRED EMBODIMENT

Figure 1:
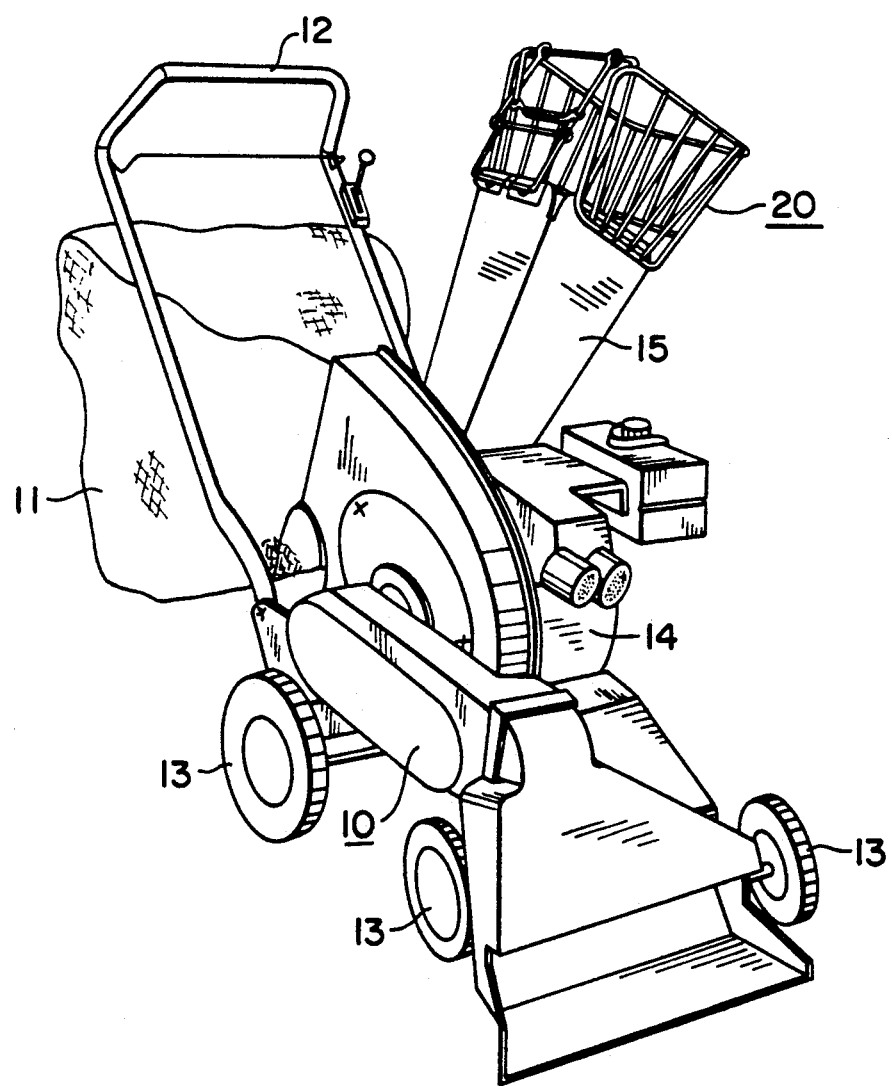
FIG. 1 is a front perspective view of suitable chipper/shredder apparatus with which the present invention is particularly useful.

Turning first to FIG. 1, the typical environment of use of the apparatus of this invention is shown in the form of a chipper/shredder vacuum cleaner identified generally by the numeral 10, which chipper/shredder vacuum cleaner is the apparatus of co-pending application Ser. No. 07/757,662, mentioned before. That chipper/shredder has a collection bag 11, control handlebars 12 for movement of the apparatus on the wheels 13, the apparatus being powered by a gasoline engine identified by the numeral 14 and having an inlet for twigs, branches and the like identified as inlet chute 15. Inlet chute extension member 20 is shown affixed to the inlet chute 15 in the upright or extended position.

Figure 2:
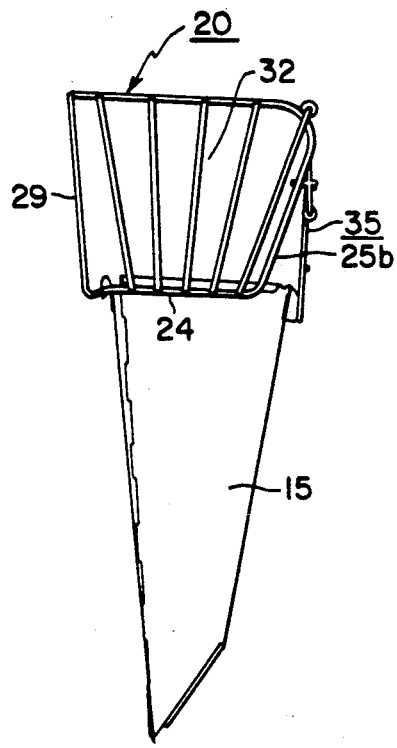
FIG. 2 is a side view of the chute extension of this invention in its upright position and attached to the typical inlet chute of a chipper/shredder such as that of FIG. 1.
Figure 4:
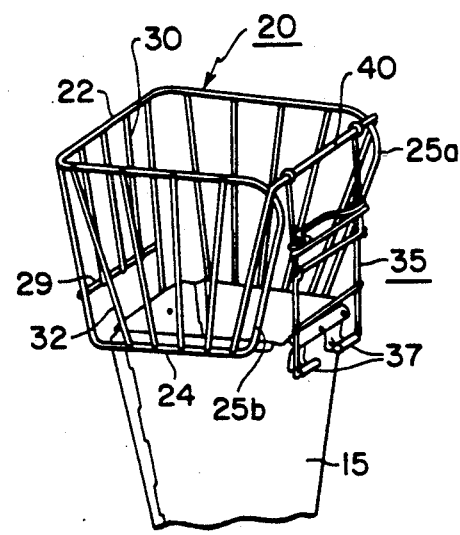
FIG. 4 is a side perspective view, with the normal inlet chute partially cut away showing the chute extension in its raised, locked position.
Figure 3:
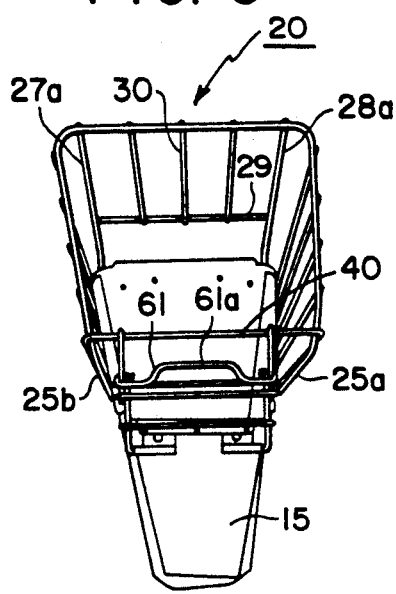
FIG. 3 is a top plan view of the apparatus of FIG. 2.

Turning next to FIGS. 2, 3 and 4 wherein a typical chipper/shredder inlet chute is designated by the same numeral 15 as used in FIG. 1, it is seen that extension member 20 generally includes a structure formed of wire rod in the preferred embodiment, which structure includes a generally open top member 22 having a generally U-shaped configuration, a bottom member 24, also having a U-shaped configuration and an open center portion, the top member 22 and the bottom member 24 being integrally joined in the preferred embodiment by side members 25a and 25b, the opposite end of base member 24 being joined to the top member at the forward edge by integral wire extensions or legs designated 27a and 28a. Legs 27a and 28a are interconnected not only by top member 22 but also by the rod structure 29 which is spaced from the base member for reasons to be later explained and is interconnected to the top member by a plurality of spaced bars 30. Top member 22 and bottom member 24 are interconnected by a plurality of spaced rods or wire members 32 disposed along each opposing side face. There is thus created a generally U-shaped, substantially rigid lattice work which can be affixed to the typical inlet chute of a chipper/shredder.

In the embodiment illustrated in the drawings, a support member 35 extends along the open face of the base member 24 and is affixed by any suitable hinge joint to the upper edge of the chipper chute inlet 15. With the lower edge of the extension so fixed in pivotal position, the rear edge of the extension is supported by the folding latchable structure generally designated 35, which structure is hingedly affixed to the opposite edge of the inlet chute at 37 and which structure is pivotally connected to a cross bar 40 best seen in FIGS. 3 and 4.

Turning next to FIGS. 5 through 8, it is seen that the support member generally designated 35 is comprised of a pair of rods 45 and 46 whose lower ends are pivotally secured at 37 to the upper end of inlet chute 15 of the chipper/shredder and whose upper portions are interconnected by a cross member 39 to hold them properly spaced to provide free ends. The upper portion of the foldable latch support for the lattice assembly is also formed of a pair of spaced rod members 48 and 49 which are pivotally connected at their upper ends to the bar 40 and provided with depending leg portions 50 and 51 which are interconnected by bar 53 so as to form a pivotal connection at 56 and 58 with the bar 59. A slidable latch member 61 has bent over ends 62 which permit it to be trapped on but slidable on the members 50 and 51 and a handle 61a so that, when in the raised position of FIG. 4, the latch 61 is slidable downwardly over the extending ends 38, 39 of the rods 45 and 46 to latch or lock that pivoting support member in the raised position shown in FIG. 2.

Figure 9:
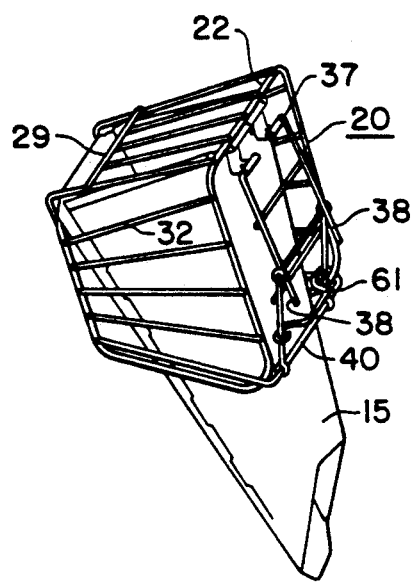
FIG. 9 is a perspective view showing the chute extension fully folded.
Figure 5:
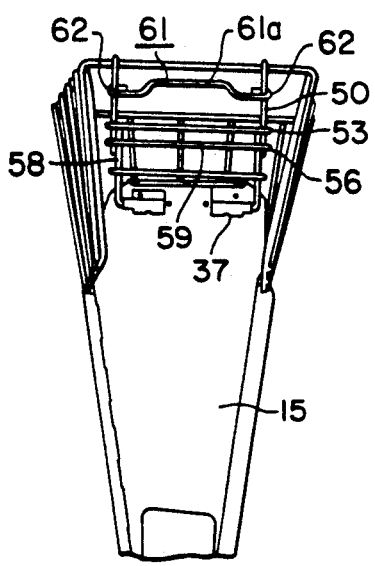
FIG. 5 is a rear elevational view of the chute extension of FIG. 2 with the inlet chute partially cut away, the locking bar shown in raised position and the support structure partially folded.
Figure 7:
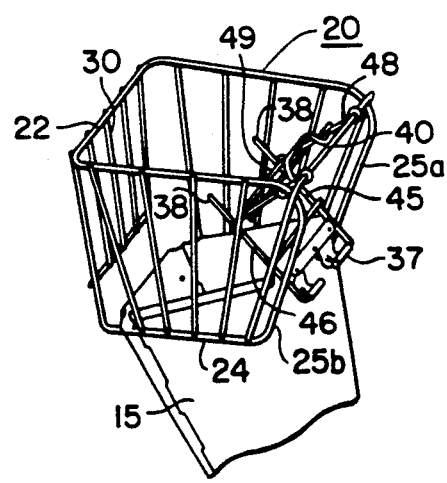
FIG. 7 is a perspective view of the apparatus of FIG. 5.
Figure 6:
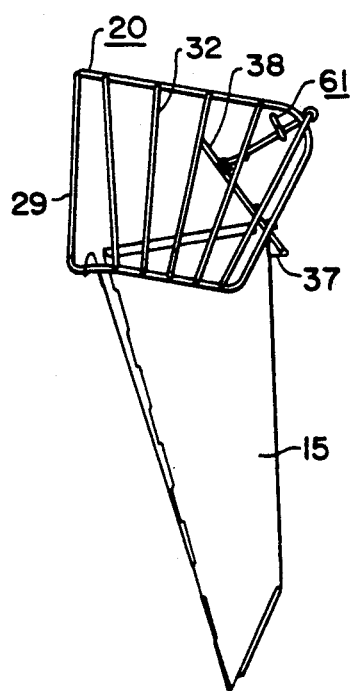
FIG. 6 is a side elevation view of the chute extension with the rear support partially folded.
Figure 8:
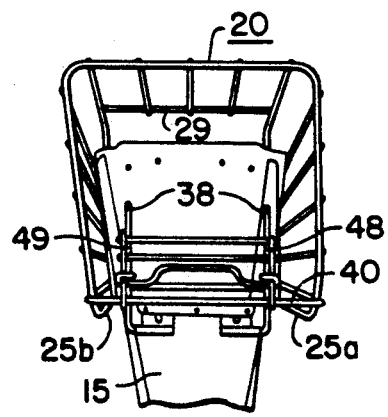
FIG. 8 is a top plan view of the apparatus of FIG. 6.

The partially folded position of FIGS. 6, 7 and 8 show the ease of operation of the lattice structure formed by the various wire rods which hinge the front edge of the bottom base member 24 directly to the front edge of the inlet chute of the chipper/shredder and hinge the rear edge through the apparatus 35 to the opposite face or edge of the inlet for the chipper/shredder. Hence, by raising latch member to the position most clearly in FIGS. 5 and 6, it is seen that the lattice work of the extension member can be folded about the various pivots with the support structure 35 collapsing into a folded position. That folded position is most clearly shown in FIG. 9 where the lattice work of the extension member is folded down on the chute while still providing spaces between the bars 30 and 32 to permit insertion of small sections of limbs to be chipped while, at the same time, reducing the overall height of the chipper/shredder of the inlet chute to permit its facile movement under low hanging limbs, etc.

It is also noted that chipper/shredders generally have the chutes extending at an angle from the main frame of the chipper/shredder such that maneuvering the chipper/shredder near vertical walls of substantial height and through gates can present significant problems with the extension in the raised position; hence, creating the pivotal interconnection with appropriate easily releasable latch structure is a significant feature of the invention.

As will be apparent to persons skilled in the art, various modifications, adaptations and variations of the foregoing specific disclosure can be made without departing from the teaching(s) of this invention.

I claim:

1. An extension member to accommodate extended length branches, and the like for insertion into the generally rectangular inlet chute of a chipper/shredder device comprising a lattice framework structure having an open bottom base member, an open top member and side elements interconnecting said base member and said top member on three contiguous sides to define a generally U-shaped passageway leading to the inlet chute of the chipper/shredder, said base member having a rectangular shape generally coextensive with the shape of the rectangular inlet of the chipper/shredder device, said top member being generally rectangular in configuration, first means for securing at least one edge of the base member of the structure to one upper edge of the inlet of the chipper/shredder inlet; and foldable second means opposite said first means and secured to the edge of the open side of the U-shaped extension member for securing the opposite edge of the base member to the chipper/shredder inlet chute, said second means having an extended and a folded position whereby said extension member may be fixed in an upright position with said second means in the extended position.

2. The extension member of claim 1 wherein the lattice framework includes said side elements interconnecting said base member and top member which are a rigid wire framework permitting maximum visibility through the extension member when the extension member is in the upright position.

3. An extension member to accommodate extended length branches, and the like for the generally rectangular inlet for a chute of a chipper/shredder device comprising a lattice framework having an open bottom base member, a open top member and wire elements interconnecting said base member and said top member to define a passageway leading to the inlet chute of a chipper/shredder, said framework having substantial open area to minimize visual obstruction, said base member having a rectangular shape generally coextensive with the shape of the inlet chute of the chipper/shredder device, said top member being generally rectangular in configuration, first means for securing at least one edge of the base member of the lattice framework to one upper edge of the chipper/shredder inlet chute; and second means for securing the opposite edge of the base member to the opposite upper edge of the chipper/shredder inlet chute.

4. The extension member of claim 3 wherein said second means permits selective movement of the lattice framework about said first means.

5. The extension member of claim 3 wherein the lattice framework is formed of spaced wire rod elements to reduce visual obstruction, said first means is a pivot connection for retaining the extension in a position affixed to the chute to which it is attached and said second means is a foldable pivoted member to permit movement of said extension member into a raised position, said second means being lockable in the raised position.

6. A foldable extension member to accommodate extended length branches, and the like for the generally rectangular inlet chute of a chipper/shredder device comprising:

a wire lattice framework having a base member, a top member, and elements interconnecting said base member and said top member along three sides thereof to provide a wire lattice framework having a generally U-shaped cross section;

first means for pivotally securing one edge of the base member opposite the open side of the framework to one upper edge of the chipper/shredder inlet chute;

an upper support member having one end pivotally secured to the top member of the lattice framework along the open side of the framework;

a lower support member having one end connected to said upper member, its other end being arranged for connection to the upper edge of the chipper/shredder inlet chute opposite the pivotal connection;

said upper support member and said lower support member being pivotally interconnected to permit the wire framework to pivot about said first means thereby to permit the framework to fold down on top of the generally rectangular inlet chute for the chipper/shredder; and means for selectively locking the upper and lower support members with the wire framework in the raised position, the support members serving to partially close the open side of the wire framework.

7. The combination of claim 6 wherein the means for selectively locking the upper and lower support members is a slidable member secured to the upper support member and movable to embrace a portion of the lower support member extending above the pivotal interconnection to said upper support member.

8. In a chipper/shredder having an inlet chute for receiving tree limbs, twigs, and the like to be reduced to small pieces and discharged, an inlet chute extension to increase the length of limb, and the like easily supported thereby, means securing said chute extension in a raised position relative to said inlet chute so as to form a substantially continuous extension thereof, said means including a releasable latch permitting movement of said chute to permit movement of said chute extension toward the chipper/shedder to obtain a lowered position, said chute extension being a lattice framework.

9. In a chipper/shredder having an inlet chute for receiving tree limbs, twigs, and the like to be reduced to small pieces and discharged, an inlet chute extension to increase the length of limb, and the like easily supported thereby, means securing said chute extension in a raised position relative to said inlet chute so as to form a substantially continuous extension thereof, said means including a releasable latch permitting movement of said chute to permit movement of said chute extension toward the chipper/shredder to obtain a lowered position, said chute being a lattice framework having spacing permitting limited access through the latch to the inlet chute when the chute extension is in the lowered position.

* * * * *